United States Patent [19]
Tendler

[11] Patent Number: 5,231,699
[45] Date of Patent: Jul. 27, 1993

[54] DUAL WATCH RADIO SYSTEM
[76] Inventor: Robert K. Tendler, 19 Lawrence Ave., Chestnut Hill, Mass. 02167
[21] Appl. No.: 732,426
[22] Filed: Jul. 17, 1991

Related U.S. Application Data
[63] Continuation of Ser. No. 571,175, Aug. 21, 1990.
[51] Int. Cl.$^5$ .................. H04B 7/00; H04B 17/02
[52] U.S. Cl. ........................... 455/66; 455/67.1; 455/344; 455/166.2
[58] Field of Search ............ 455/77, 76, 88, 166, 455/161, 9, 66, 67.1, 344, 161.1, 166.2, 34.1, 38.2; 340/539

[56] References Cited

U.S. PATENT DOCUMENTS

| | | | |
|---|---|---|---|
| 4,105,974 | 8/1978 | Rogers | 455/88 |
| 4,164,709 | 8/1979 | Tudor et al. | 455/88 |
| 4,216,431 | 8/1990 | Imazeki et al. | 455/88 |
| 4,216,545 | 8/1980 | Flickshu | 455/77 |
| 4,267,597 | 5/1981 | Volpi et al. | 455/77 |
| 4,651,282 | 3/1987 | Robinson et al. | 455/77 |
| 5,073,972 | 12/1991 | Tendler et al. | 455/38.2 |

*Primary Examiner*—Reinhard J. Eisenzopf
*Assistant Examiner*—Lisa Charouel
*Attorney, Agent, or Firm*—Robert K. Tendler

[57] ABSTRACT

A method and apparatus is provided for maintaining a dual watch on marine radio bands and more especially on the VHF radio band in which a stand-alone battery-powered receiver is tuned to one of the two dual watch frequencies, with the main transceiver being automatically tuned to the other of the dual watch frequencies, such that the main radio can monitor an emergency channel, such as channel 16, whereas the stand-alone battery-powered receive-only radio can be utilized to monitor any other channel, but most especially the new channel 9 calling channel. The system thus provides both a monitoring function for the emergency channel as well as a monitor for the new hailing channel.

6 Claims, 1 Drawing Sheet

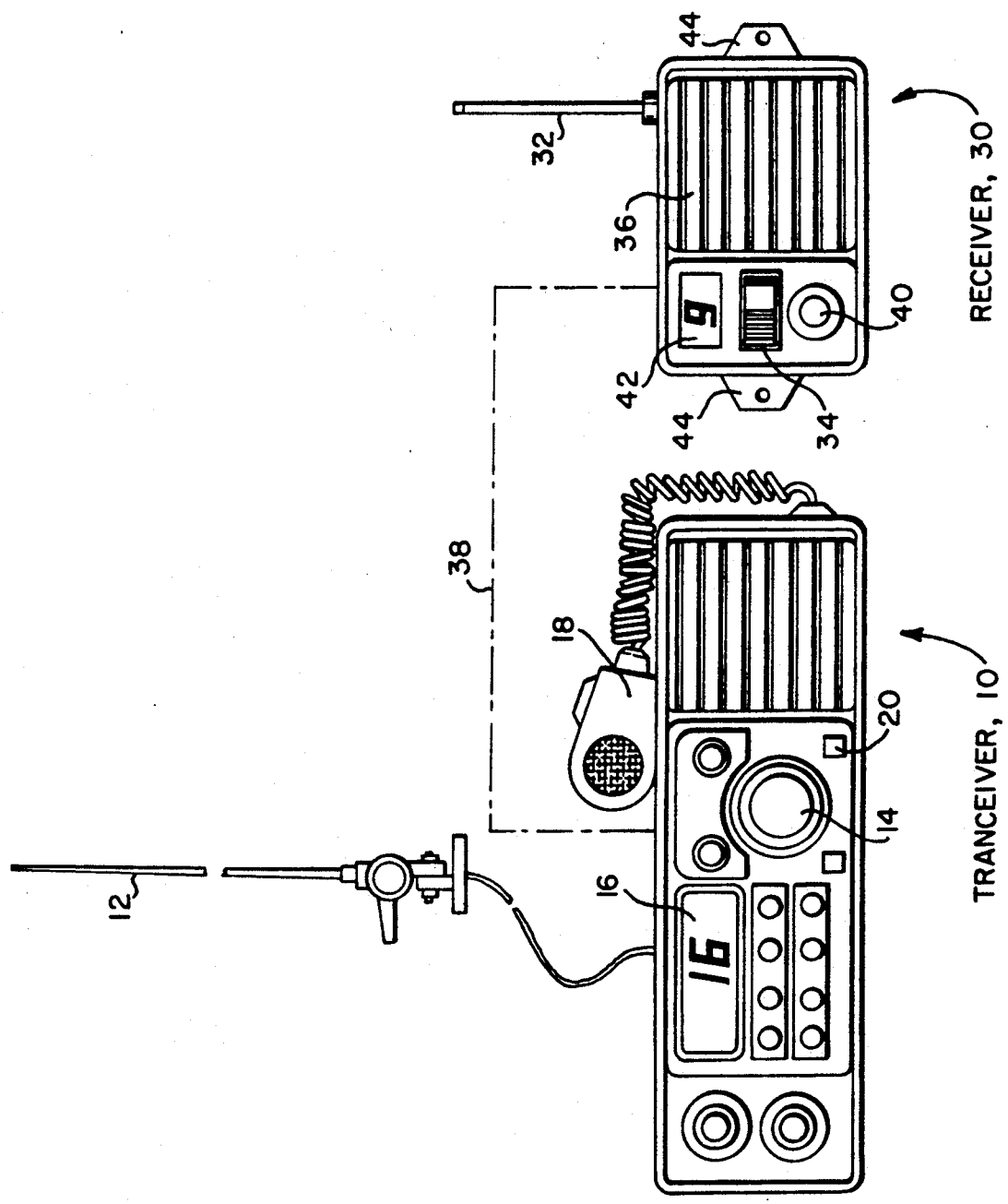

DUAL WATCH RADIO SYSTEM

This is a continuation of application Ser. No. 571,175 filed Aug. 21, 1990 now abandoned.

FIELD OF INVENTION

This invention relates to marine communications and more particularly to maintaining a dual watch on an emergency channel and a hailing channel simultaneously.

BACKGROUND OF THE INVENTION

It has become increasingly clear on marine VHF radio channels that channel 16, being both used for a hailing channel and an emergency communication channel is so overcrowded that federal authorities have considered mandating the utilization of an alternative channel, such as channel 9, as the hailing channel, thereby to leave the emergency channel, channel 16, free of interference.

The reason for the authorization of an alternative hailing channel stems from the incessant usage of channel 16 for vessels to hail other vessels or for the use of this channel for a non-essential traffic. The situation has become so intolerable that the federally mandated requirement to monitor channel 16 is largely ignored in practice. There have been suggestions that other channels be utilized which are dedicated to hailing alone. However one of the problems with such a suggestion is that most present VHF transceivers do not have a dual watch capability. As a result of this, authorization for the utilization of channel 9 as a hailing channel alone has been delayed.

SUMMARY OF THE INVENTION

In order to solve the problem of a dual watch where existing transceivers do not have such a dual watch capability, a method is provided for maintaining the dual watch without having to replace the present main radio with a radio having a built-in dual watch. In order to do so, a battery powered, receive-only radio of a very inexpensive nature is provided which is tuned to one of the dual watch channels, preferably the hailing channel, as opposed to the emergency channel. The reason for this is that two-way communication is required on the emergency channel, whereas the hailing channel only requires a receiver to announce that someone is trying to hail another vessel. Those utilizing the hailing channel and knowing the recipient has a receive-only unit merely specifies what channel he wishes the hailed vessel to come back on. This solves an immediate need in an inexpensive manner such that the dual watch function is solved by having one of the two watch channels monitored by a receive-only unit. This unit is normally battery operated and can be in a small self-contained modular form with its own separate antenna. Alternatively, the unit may be provided with means to tap off of the antenna utilized for the main transceiver. A system implementing the above method merely requires the utilization of a main transceiver having a single watch capability and the provision of an auxiliary receive-only unit, tuned to the hailing channel.

BRIEF DESCRIPTION OF THE DRAWINGS

These and other features of the subject invention will be better understood taken in conjunction with the Sole Drawing of which.

The sole drawing FIGURE is a diagrammatic representation of the system in which a dual watch capability is produced through the provision of a full function transceiver having a single watch capability and the provision of an auxiliary receive-only unit tuned to one of the two dual watch channels.

DETAILED DESCRIPTION

Referring now to the sole drawing FIGURE, a main transceiver 10 is illustrated as having an antenna 12, tuning knob 14 and a display 16, with a microphone 18 coupled to the unit. As is common with such units upon turn on by a switch 20, the unit is automatically powered up on channel 16, the emergency channel for VHF radios. This provides at least a single watch capability and is common for standard VHF radios. The same applies for HF transceivers in which power-up provides that the transceiver is tuned to the emergency channel. This emergency channel is presently utilized for both emergency communications and hailing. However, due to the amount of traffic on channel 16 of a non-emergency nature, mostly having to do with the hailing of other vessels, yacht clubs or other facilities which are shore-based, regulations have been promulgated so that the emergency channel, namely channel 16, be dedicated solely to emergency communications, thus to eliminate the clutter on this channel. In order to do this and with a limited number of channels available, the authorities have proposed VHF channel 9 as the hailing channel.

In order for this system to be adopted, new VHF radios are to be provided with a dual watch capability, and in fact some relatively expensive VHF radios do have a dual watch or a multiple watch capability. However, it will be appreciated that instructing individuals as to how to set up a dual watch capability is cumbersome for those not initiated in the operation of the VHF radio as is the case for a large number of boaters.

On the other hand, dual watch capability can be immediately established through the utilization of a battery-powered unit 30, having its own internal battery (not shown) and its own antenna 32, either external as shown or carried internally. Here the unit is provided with a receive only circuit tuned to channel 9 in one embodiment. The unit is provided with an on/off switch 34 and a speaker 36 such that the dual watch capability can be obtained simply by turning on the main radio as well as this auxiliary receive-only unit. Also provided is a volume control 40 and an optional channel display 42, and optional apertured mounting flanges 44.

The advantage of such a system comes from the finding that the antenna for the main radio need not be utilized by the auxiliary unit in order to obtain hailing information, since a whip-type auxiliary antenna on the auxiliary unit provides sufficient reception at least for hailing purposes. Also, internal ferrite loop antennas provide acceptable results. Thus, while it might be thought that in order to obtain satisfactory performance, one would have to utilize an antenna with an amount of gain and performance equal to that of the main antenna, this has been found not to be a problem at least within the coastal water range of 25 miles for present VHF radio communications.

Alternatively, the antenna for the auxiliary receive-only unit may be coupled in any conventional manner to the antenna utilized for the main unit as illustrated by dotted line 38.

What has been provided is a system for accommodating the requirement for decluttering the emergency channel by providing a separate exclusive hailing channel. What will also be appreciated is that the auxiliary unit may have its own self-contained power supply or may be coupled to ship's power. Regardless of the method of powering the auxiliary unit, it provides an exceptionally useful function with its cost effective, receive-only mode and thereby eliminates the problem of having to provide a new dual watch receiver.

While the invention has been described in terms of VHF marine radios, it will be appreciated that the subject invention is not limited thereto but is rather concerned with the immediate ability to provide a dual watch capability for any radio band. It will be appreciated that by dual watch is meant the ability to monitor a Particular channel, which channel is also utilized for two-way communications. Thus the provision of a weather band radio is not considered to be within the scope of a dual watch capability because the weather channel broadcast does not involve two-way communication.

Moreover, it will be appreciated that the receive-only radio can be turned on only when the operator desires to be appraised of callers. This means the subject system permits constant monitoring of the emergency channel, now uncluttered with hailing traffic, while permitting selective monitoring of the crowded hailing channel only when the operator is in need of such information. This cuts down the annoyance of having to constantly monitor the cluttered calling channel.

Having above indicated a preferred embodiment of the present invention, it will occur to those skilled in the art that modifications and alternatives can be practiced within the spirit of the invention. It is accordingly intended to define the scope of the invention only as indicated in the following claims.

I claim:

1. A system for providing a dual watch capability on marine channels to implement dual watch requirements for emergency and hailing transmission on different first and second radio channels, said first channel dedicated to emergency hailing and communications as an emergency hailing channel and said second channel dedicated to non-emergency hailing as a non-emergency hailing channel, comprising:
    a full function marine transceiver having its own speaker and having at lest a single watch capability with the capability thereof being provided upon power-up of the unit, and with the watch being determined either by the channel which is selected or by a present default channel; and
    a separate and distinct auxiliary receive-only VHF radio having its own speaker, said receive-only VHF radio operating independently of said full function transceiver and being tuned exclusively to said second channel so as to provide a monitoring function for, said non-emergency hailing channel, whereby there is no speaker sharing and whereby one employing the system can be hailed on one dual watch channel while at the same time monitoring the other of the dual watch channels.

2. The system of claim 1 wherein said full function transceiver has an antenna coupled thereto, wherein said auxiliary receive-only VHF radio has an antenna input and wherein the antenna input to the auxiliary radio is coupled to the antenna associated with the full function transceiver.

3. The system of claim 1 wherein said auxiliary receive-only VHF radio includes means for battery-powering the auxiliary radio.

4. The system of claim 1 wherein said auxiliary receive-only VHF radio has a separate antenna coupled thereto.

5. A method of implementing dual watch requirements for emergency and hailing transmissions on different radio channels, a first one of said channels dedicated to emergency hailing and communications as an emergency hailing channel and a second one of said channels dedicated to non-emergency hailing as a non-emergency hailing channel comprising the steps of:
    providing a full function two-way transceiver having its own speaker and a single channel watch function; and
    providing a separate and distinct receive only self-contained radio having a separate speaker to provide an audio output in the vicinity of the full function transceiver, the receive-only radio tuned exclusively to the second of said channels corresponding to the non-emergency hailing channel, whereby the speakers are not shared to permit simultaneous monitoring of both channels.

6. The method of claim 5 wherein the receive only radio is selectively activated into an ON condition regardless of the status of the full function transceiver, whereby constant watch may be maintained on the emergency channel and a selectively activated watch on the hailing channel.

* * * * *